E. McOUAT.
MUSICAL BLOCKS.
APPLICATION FILED JUNE 20, 1917.

1,284,400.

Patented Nov. 12, 1918.

Inventor
Elizabeth McOuat
By her Attorney

UNITED STATES PATENT OFFICE.

ELIZABETH McOUAT, OF NEW YORK, N. Y.

MUSICAL BLOCKS.

1,284,400. Specification of Letters Patent. Patented Nov. 12, 1918.

Application filed June 20, 1917. Serial No. 175,738.

*To all whom it may concern:*

Be it known that I, ELIZABETH McOUAT, a subject of the King of Great Britain, residing at the city, county, and State of New York, have invented certain new and useful Improvements in Musical Blocks, of which the following is a specification.

My invention relates to apparatus for teaching pianoforte music.

The objects of this invention are to provide apparatus for teaching the arrangement and names of the keys of a standard pianoforte keyboard, which apparatus is simple to manipulate and by means of which the art of reading pianoforte music may be readily acquired through the sense of sight.

To these ends, my invention comprises a chart divided to represent a pianoforte keyboard, each division bearing a characteristic mark, and a plurality of sets of dummy keys bearing corresponding characteristic marks, whereby said dummy keys may be placed in their proper position relative to the divisions of the chart and to the ivory keys of the instrument represented thereby.

Figure 1:
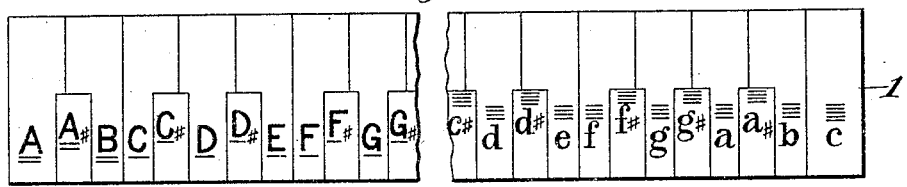
Figure 2:
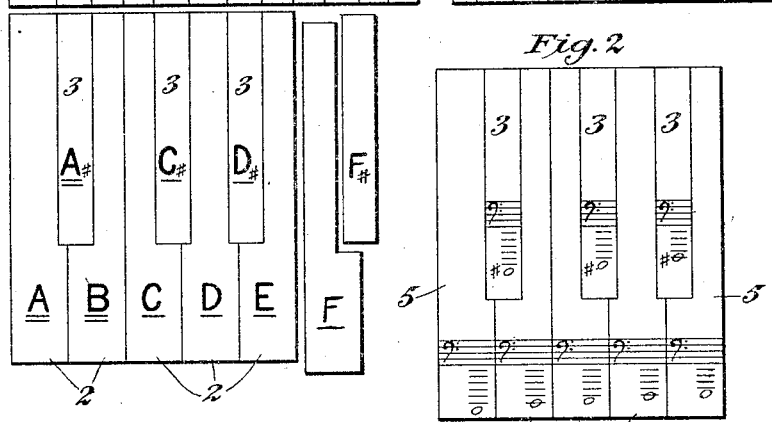
Figure 3:
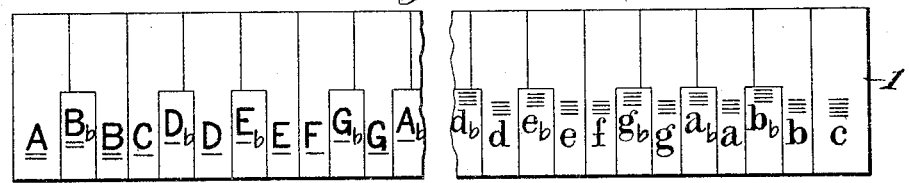
Figure 4:
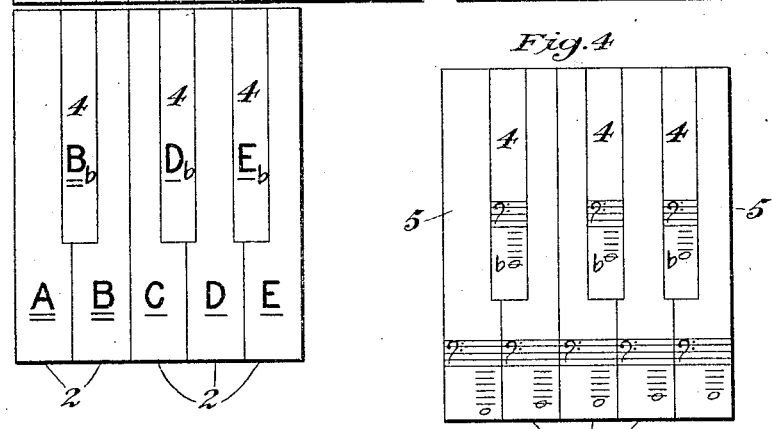

In the accompanying drawings, illustrating my invention, Figure 1 is a view showing the obverse side of the chart, partly broken, with a bank of dummy keys in their matched position relative thereto. Fig. 2 represents a bank of keys, corresponding to those shown in Fig. 1 but marked with the staff notation only. Fig. 3 is a view of the reverse side of the chart, also partly broken, and showing a bank of matched keys and, Fig. 4 is a view of the bank of keys corresponding to those shown in Fig. 3 but marked with the staff notation only.

Both sides of the chart 1 are divided into eighty-eight spaces to represent the fifty-two white keys and the thirty-six black keys of a pianoforte keyboard. The chart is made of cardboard or other suitable material and constructed to permit of folding into a small compass for convenience in handling. It is preferably of a length equal to that of the standard keyboard so that when it is placed in upright position at the back of the keyboard, the divisions of the chart will aline with the corresponding keys of the instrument. If desired, the spaces indicating the black keys, on both sides of the chart, may be blackened.

The spaces representing the white keys are marked with the alphabetical names of the keys, the various registers being preferably indicated as follows:

Sub-contra series, A̳ B̳.

Contra series, C̳ D̳ E̳ F̳ G̳ A̳ B̳

Great series, C D E F G A B

Small series, c d e f g a b

One-lined series, c̄ d̄ ē f̄ ḡ ā b̄

Two-lined series, c̿ d̿ e̿ f̿ g̿ a̿ b̿

Three-lined series, c d e f g a b

Four-lined series, c d e f g a b

Five-lined series, c.

The spaces indicating the black keys are likewise marked with alphabetical characters, those on the obverse side of the chart being marked as sharps, as shown in Fig. 1, and those on the reverse side, shown in Fig. 3, as flats.

A set of fifty-two dummy white keys 2, one for each of the white keys of the instrument, is provided, said dummy keys being made of a suitable stiff material and cut in the size and shape of the corresponding ivory keys so that they can be laid thereon.

The dummy keys 2 are each marked on the obverse side with an alphabetical character similar to that of the corresponding division of the chart and on the reverse side with the staff notation similar to the markings on keys 5 of Figs. 2 and 4.

Two sets, of thirty-six dummy keys each, are provided for the black keys of the instrument, one set, indicated in the drawings by the keys 3, being provided for the sharps and the other set, indicated by the keys 4, for the flats. Said dummy keys are cut in rectangular shape to fit on the black ivory keys of the instrument and are marked on one side with an alphabetical character, indicating the name of the key, and on the other side with its staff notation.

It is apparent that when the dummy keys 2 are turned over to expose the staff notation, they will not fit on the corresponding ivory keys, and, therefore, in carrying out my invention I provide a further set of fifty-two dummy white keys 5, similar in size and shape respectively to the keys 2 but marked with the staff notation only, said keys 5 being adapted to be laid on the corresponding dummy keys 2 when the latter are in matched position relative to the chart or directly upon the ivory keys of the instrument as desired. The keys 3 and 4, being rectangular in shape, can be laid on the corresponding ivory keys with either face downward and it is, therefore, unnecessary to provide an additional set of those keys.

If desired, additional sets of dummy keys may be provided bearing the staff notation of all of the notes in the various ways in which they can be represented. That is to say, sets may be provided for all of the double sharps, double flats, C and F flats, B and E sharps, and for the notes as written in the lines and spaces below the treble staff or above the base staff.

The manner in which my apparatus is used is as follows:

The folding chart 1 is adjusted in upright position at the back of the keyboard of the pianoforte. This can be easily done by slipping it into the space adjacent to the rear ends of the black keys of the instrument. The alphabetically marked dummy keys 2 and 3, or 2 and 4, as the case may be, depending upon which side of the chart is exposed, are then placed over the corresponding ivory keys of the instrument whose name they bear by simply matching the markings on the dummy keys with those on the chart. In this manner the arrangement and the names of the various keys of the pianoforte keyboard can be very easily learned.

To acquire the art of reading the staff notation, the keys 2, which have already been placed in their proper position relative to the keyboard, are turned over to expose the staff notation marked on the reverse side of said keys and then the keys 5, bearing the corresponding staff notation, are matched therewith. The alphabetically marked dummy white keys when turned over will, of course, not fit the ivory keys and the pupil can either substitute the staff notation keys for them or turn them letter side up again and lay the staff notation keys over them. In the case of the black keys, it is merely necessary to turn the alphabetically marked keys upside down to expose the staff notation. In this way the dummy keys bearing the staff notational representation of the tones of the pianoforte are superposed on the keys on which they are to be played and the pupil will readily learn to designate the tones by means of the staff notation.

It will be understood that if desired the apparatus may be used apart from the pianoforte, in which case the chart will be suitably supported on a table or other flat surface and the dummy keys laid in their proper order thereon.

What I claim is:

1. An educational keyboard consisting of a set of dummy keys to fit the keys of a piano, each of said dummy keys being marked on its obverse side with the alphabetical character of the note which it represents, and on its reverse side with the staff notation of said note, and a second set of dummy keys bearing the staff notations only and formed to be superposed on or replace the keys of the first set.

2. An educational keyboard comprising a set of dummy keys shaped to fit the keys of a piano keyboard when they are arranged thereon with their obverse sides facing upwardly, their obverse sides bearing identifying markings and their reverse sides bearing the staff notations which the respective keys represent, and a chart spaced to correspond with the keys of a piano keyboard provided with markings similar to the identifying markings of the keys to serve as a guide in the fitting of the dummy keys to the keys of a piano keyboard, and a second set of dummy keys also shaped to fit the keys of a piano keyboard and bearing on their obverse sides staff notations corresponding to those on the reverse side of the first set whereby the second set of dummy keys may replace or be superposed on the first dummy keys.

3. In an educational keyboard, a set of dummy keys shaped to fit the keys of a piano keyboard and bearing identifying marks on their observe sides and the respective staff notations on their reverse sides, and a second set of dummy keys bearing the staff notations on their obverse sides.

ELIZABETH McOUAT.